Sept. 2, 1941.    E. T. BREEDEN    2,254,991
STORAGE BATTERY CARRIER
Filed Nov. 18, 1940    2 Sheets-Sheet 1

Inventor
E. T. Breeden

By Clarence A. O'Brien
and Hyman Berman
Attorneys

Sept. 2, 1941.   E. T. BREEDEN   2,254,991
STORAGE BATTERY CARRIER
Filed Nov. 18, 1940   2 Sheets-Sheet 2
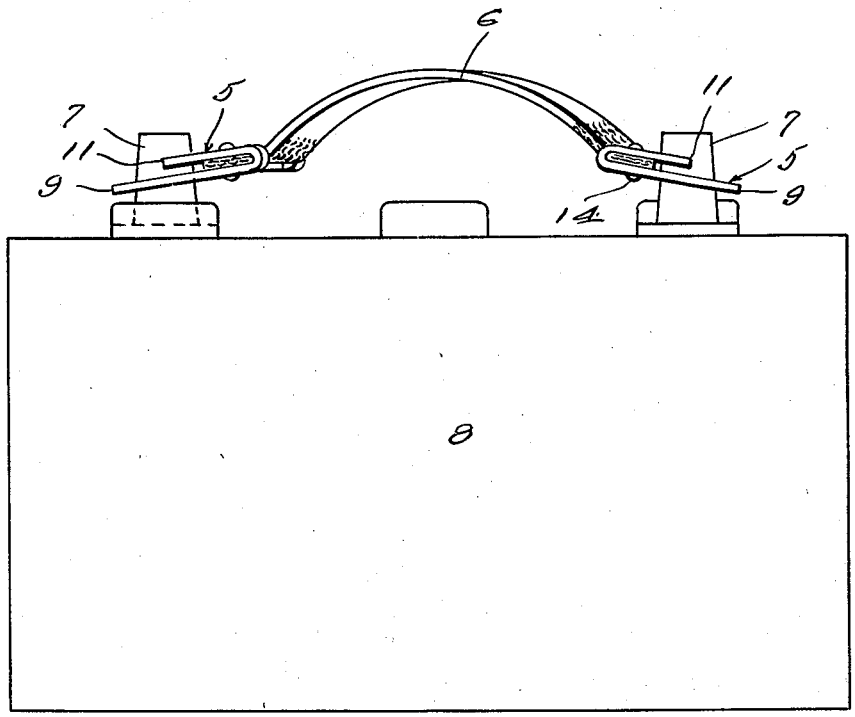
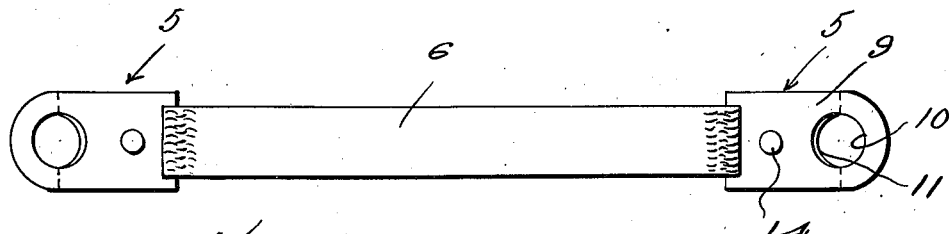
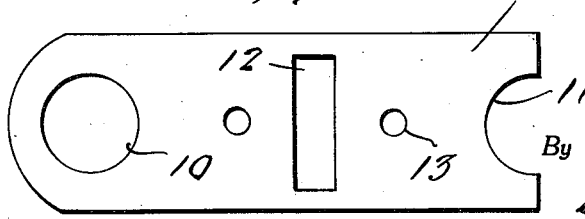
Inventor
E. T. Breeden
By Clarence A. O'Brien
and Hyman Berman
Attorneys Patented Sept. 2, 1941

2,254,991

UNITED STATES PATENT OFFICE 2,254,991

STORAGE BATTERY CARRIER

Edward T. Breeden, Fort Dodge, Iowa, assignor of one-half to Helmuth L. Rumme, Fort Dodge, Iowa Application November 18, 1940, Serial No. 366,159

2 Claims. (Cl. 294—92)

This invention relates to a storage battery carrier, and has for the primary object the provision of a device of this character which will permit the carrying of a battery safely by the terminals and which is extremely easy to apply and remove from the terminals when the battery is at rest on a support and when lifted by the device the terminal engaging elements thereof will bite into the terminals and obviate any possibility of slipping therefrom and freeing the battery and which includes a strap-type handle to permit a firm hand grip to be obtained thereon and which will bring the terminal engaging elements into biting engagement with the terminals when the battery is lifted by the handle.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a carrier constructed in accordance with my invention and showing the same applied to the positive and negative terminals of a storage battery.

Figure 2 is a side elevation illustrating the same.

Figure 3 is a bottom plan view illustrating the device.

Figure 6 is a plan view illustrating a blank from which the terminal engaging element is made.

Figure 1:
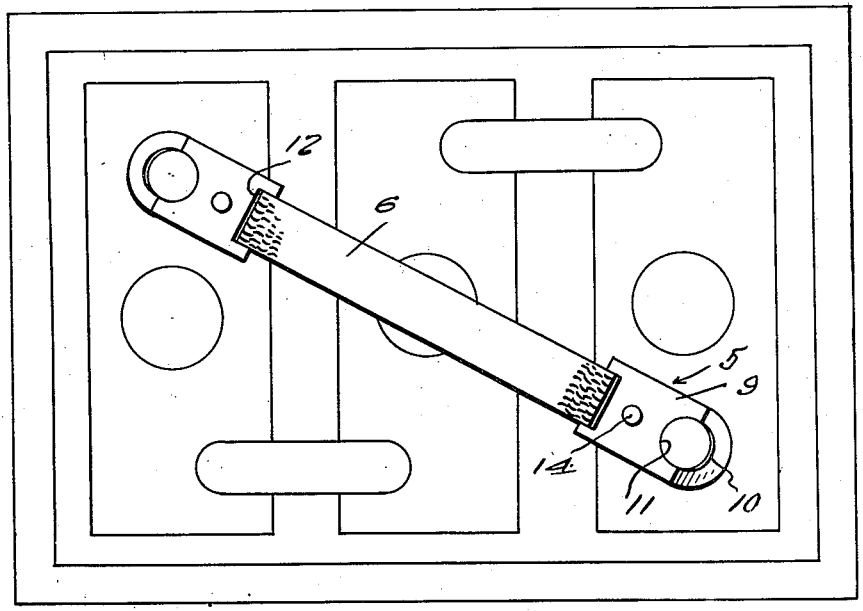

Referring in detail to the drawings, the numeral 5 indicates battery terminal engaging elements connected together by a flexible handle 6 of the strap type which will permit the elements 5 to be readily placed on the terminals 7 of a storage battery 8, as shown in Figures 1 and 2. Each terminal element is in the form of an elongated plate 9 which is provided adjacent one end with a terminal receiving opening 10 while its opposite end is provided with an arcuately curved notch 11. The plate 9 is further provided with an elongated slot 12 arranged intermediate its ends and extending transversely thereof. Rivet openings 13 are provided in the plate 9 at oposite sides of the slot. The plate 9 is bent upon itself substantially intermediate its ends or centrally through the slot 12 so as to bring the notch 11 substantially over the opening 10. The notched end of the plate provides to the terminal engaging element a jaw portion also the end of the plate having the opening 10 provides to the terminal engaging element a jaw portion. The jaw portions coact when the terminal element is placed on a battery terminal in obtaining a firm grip by the notched end biting into the terminal, also one wall of the opening 10 binds tightly against the terminal when the terminal engaging element is disposed at a slight inclination on the battery terminal due to the lifting of the battery by the handle. The greater the weight of the battery the firmer the grip of the terminal elements on the terminals of the battery will be, obviating any possibility of the handle becoming accidentally detached from the battery as long as it is under the weight of the battery.

Figure 4:
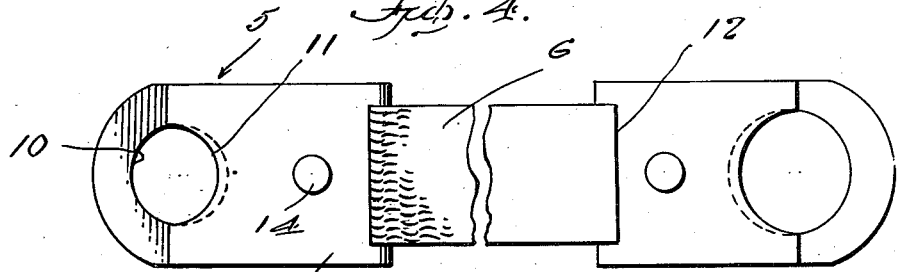
Figure 4 is a top plan view of the device illustrating a slight modification of the invention.

The construction of some storage batteries is such that the terminals thereof are of the same external diameter and in this case the terminal engaging element, as shown in Figure 3, will have openings of a size to receive said terminals. In other instances, the positive terminal of a storage battery will be of an external diameter different from the external diameter of the negative terminal and to adapt the present invention to this type of storage battery the terminal engaging elements, as shown in Figure 4, will be so arranged that one of the terminal engaging elements will have an opening of a certain diameter to match the external diameter of the positive pole while the other terminal engaging element will have an opening of a diameter to match the negative terminal of the battery. Consequently, it will be seen that in this instance the carrying device will have its terminal engaging elements provided with openings of different diameters so as to match the diameters of the positive and negative terminals or poles of the battery.

Figure 5:
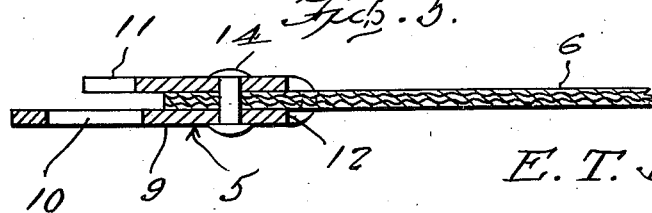
Figure 5 is a fragmentary longitudinal sectional view showing a portion of the handle with one of the terminal engaging elements.

To connect the strap 6 to the terminal engaging elements, the end portions of the strap are passed through the slots 12, as shown in Figure 5, and rivets extend therethrough and through the openings 13, the rivets being indicated by the character 14. Thus it will be seen that the end portions of the handle are firmly anchored within the terminal engaging elements and protected thereby.

By referring to Figures 3 and 4 it will be seen that the jaw portions formed by the notched ends 11 of the plates of the terminal engaging elements are slightly offset from the openings. This will permit the terminal engaging elements to be freely passed onto the terminals or posts of the battery when the terminal engaging elements are disposed horizontally or at right angles to the posts or terminals and when the battery is lifted by the handle, the terminal engaging elements incline slightly on the posts or terminals and thereby move into biting engagement with the terminals or posts.

It is believed that the foregoing description when taken in connection with the drawings will fully set forth the construction and advantages of this invention to those skilled in the art to which such a device relates, so that further detailed description will not be required.

What I claim is:

1. In a battery storage carrier comprising a strap type handle, terminal engaging elements each including an elongated plate-like portion having a notch at one end and an opening adjacent its opposite end and a slot substantially intermediate its ends and bent upon itself to bring the notched end substantially in alignment with the opening, said slots of the plate-like portions receiving end portions of the handle, and means for securing the end portions to the plate-like portions and for retaining the latter in the bent formation.

2. A storage battery carrier comprising terminal engaging elements each including an elongated plate-like portion having an opening adjacent one end and a notch in its opposite end and a slot substantially intermediate its ends and bent upon itself through said slot to bring the notched end in substantial alignment with the opening and coacting therewith to form jaw portions for gripping a terminal of a battery, a handle of a strap type having its ends portions extended through the slots, and rivets extending through the bent parts of the plate-like portions of the terminal engaging elements and through the end portions of the handle.

EDWARD T. BREEDEN.